(12) United States Patent
Yagi

(10) Patent No.: US 7,391,044 B2
(45) Date of Patent: Jun. 24, 2008

(54) MOVABLE-COMPONENT LINEAR DRIVE APPARATUS

(75) Inventor: Keiichi Yagi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 10/995,131

(22) Filed: Nov. 24, 2004

(65) Prior Publication Data

US 2005/0116188 A1    Jun. 2, 2005

(30) Foreign Application Priority Data

Nov. 27, 2003    (JP) .............................. 2003-397052

(51) Int. Cl.
*G01N 23/02*    (2006.01)
(52) U.S. Cl. ...................................... 250/591
(58) Field of Classification Search .................. 250/591
See application file for complete search history.

(56) References Cited

U.S. PATENT DOCUMENTS

| 4,831,461 | A | * | 5/1989 | Ohta et al. .................. 358/296 |
| 5,081,355 | A | * | 1/1992 | Miyagawa et al. ........... 250/582 |
| 5,081,357 | A | * | 1/1992 | Agano ......................... 250/589 |
| 5,736,746 | A | * | 4/1998 | Furutoh ....................... 250/589 |
| 6,268,614 | B1 | | 7/2001 | Imai |
| 6,310,358 | B1 | | 10/2001 | Zur |
| 2003/0199347 | A1 | * | 10/2003 | Hillis .......................... 474/68 |
| 2005/0006180 | A1 | * | 1/2005 | Mustalahti et al. .......... 187/254 |
| 2005/0029475 | A1 | * | 2/2005 | Katz ........................... 250/589 |

* cited by examiner

*Primary Examiner*—David P. Porta
*Assistant Examiner*—Marcus H Taningco
(74) *Attorney, Agent, or Firm*—Sughrue Mion, PLLC

(57) ABSTRACT

Load fluctuations caused by a change in moving direction of a linear motor 23 are prevented by affixing a belt 21 tensioned by a pair of pulleys 22 on the linear motor 23 for moving a reading light source portion 31 and affixing a counterweight 26 on the belt 21 at a portion diagonally opposite to the portion where the linear motor 23 is affixed with respect to the center axis of the belt 21. Further, damping devices (magnets 40 and 41) which impart a bias load to the counterweight 26 in the direction perpendicular to the tensioning direction of the belt 21 is provided, so that vibration produced during traveling of the linear motor 23 is suppressed and accordingly the traveling accuracy of the linear motor 23 is increased.

2 Claims, 3 Drawing Sheets

MOVABLE-COMPONENT LINEAR DRIVE APPARATUS

BACKGROUND OF THE INVENTION

1. Field of the Invention

The present invention relates to a movable-component linear drive apparatus for linearly moving a movable component, for example, a light source of a scanning device for scanning a subject of photograph with linear light.

2. Description of the Related Art

Heretofore, various radiation-image recording mediums, for recording a radiation image of a subject upon exposure to radiation transmitted through subjects, have been proposed and put into practical use in a variety of fields, including the medical field.

Such radiation image recording mediums include, for example, a radiation image detector using a semiconductor material which develops electric charges upon exposure to radiation, and a stimulable phosphor sheet which accumulates radiation energy upon exposure to radiation and exhibits photostimulated luminescence upon exposure to reading light.

When reading out a radiation image as an electric signal from the aforementioned radiation image recording medium, a reading light source which emits linear reading light is employed from the viewpoint of rapid readout, and the radiation image recording medium is scanned with the reading light by moving the reading light source in a direction substantially perpendicular to the longitudinal direction thereof (see U.S. Pat. No. 6,268,614).

In the present day, from the viewpoint of miniaturization, there has been proposed a cassette, in which the radiation image recording medium as mentioned above and a reading light scanning device including a reading light source are both provided. Using such a cassette allows a radiation image to be read out immediately after the radiation image is recorded by a radiation image recording system. It is also possible to readily record another radiograph image under another imaging condition based on the observation of the read out radiation image.

For a mammographic X-ray system, for example, a cassette position may be varied depending on the imaging conditions when taking radiophotographs. Thus, the reading light source is not limited to be moved horizontally, but may have to be moved in a direction inclined with respect to the horizontal direction.

Accordingly, for example, if the reading light source is moved by means of a motor and the driving current of the motor is optimally selected for horizontally moving the reading light source, when the moving direction of the reading light source is changed to, for example, a vertically rising direction, a shortage of the driving current would be caused since the load, with respect to the motor, increases due to the effect of gravity. This prevents stable movement of the reading light source, which would result in degradation of image quality of the read-out radiation image. On the other hand, if a driving current sufficient for moving the reading light source in the vertically rising direction is always applied in order to avoid the shortage of driving current, when the reading light source is moved horizontally or downward, overtorque is caused immediately after the beginning of the traveling of the reading light source. This also prevents the reading light source from being moved with stability, which would result in degradation of image quality of the read-out radiation image.

The typical methods of overcoming the disadvantages mentioned above include reducing the weight of the reading light source and selecting a motor having an extremely high motor rating, as long as the overall driving load is not affected thereby. However, such reading light sources and such motors are very expensive, thereby increasing the manufacturing cost.

Some radiation image recording systems are designed to perform scanning with reading light while moving the radiation image recording medium without changing the position of the reading light source. Even in such radiation image recording systems, when the moving direction of the radiation image recording medium changes, stable movement of the radiation image recording medium would not be ensured, causing degradation of the image quality of the read out radiation image, as in the case where the moving direction of the reading light source changes.

SUMMARY OF THE INVENTION

In view of the foregoing observations and description, it is an object of the present invention to provide a movable-component linear drive apparatus for linearly driving a movable component, for example, a reading light source, which is useful for scanning a radiation image recording medium as mentioned above, wherein even when the moving direction of a reading light source or a radiation image recording medium, each of which is a movable component, changes, stable movement of the movable component is ensured.

A movable-component linear drive apparatus of the invention comprises: an endless member in the form of rope or belt; a pair of tensioning devices for tensioning the endless member; a movable component affixed to the endless member; a counterweight affixed to the endless member at a portion diagonally opposite to the portion, to which the movable component is affixed, with respect to the center axis of the endless member; a damping device for imparting a bias load to the counterweight in the direction perpendicular to the tensioning direction of a part of the endless member adjacent to the counterweight; and a driving device for linearly driving the movable component in the same direction as the tensioning direction of a part of the endless member adjacent to the movable-component.

According to the present invention, the driving device may be a linear motor which linearly drives the movable component in the tensioning direction of a part of the endless member adjacent to the movable component.

Further, the movable-component linear drive apparatus of the present invention may further comprise: a radiation image recording medium in which a radiation image is recorded upon exposure to radiation bearing the radiation image and from which the radiation image recorded therein is read out as a signal by scanning the radiation image recording medium with reading light; and a light source which is integrally attached to the movable component and emits linear reading light that extends in the direction perpendicular to the linearly moving direction of the movable component The movable-component linear drive apparatus of the present invention comprises an endless member in the form of rope or belt, a pair of tensioning device for tensioning the endless member, a movable component affixed to the endless member, and a driving means for linearly driving the movable component in the same direction as the tensioning direction of a part of the endless member adjacent the movable-component side, and a counterweight affixed to the endless member at a portion diagonally opposite to the portion, to which the movable component is affixed, with respect to the center axis of the endless member. As a result, stable movement of the movable component is ensured. Further, damping devices for imparting a bias load to the counterweight in the direction perpendicular to the tensioning direction of the endless member is provided, so that vibrations produced during movement of the movable component can be suppressed and accordingly the traveling accuracy of the movable component can be enhanced.

DESCRIPTION OF THE PREFERRED EMBODIMENTS

Figure 1:
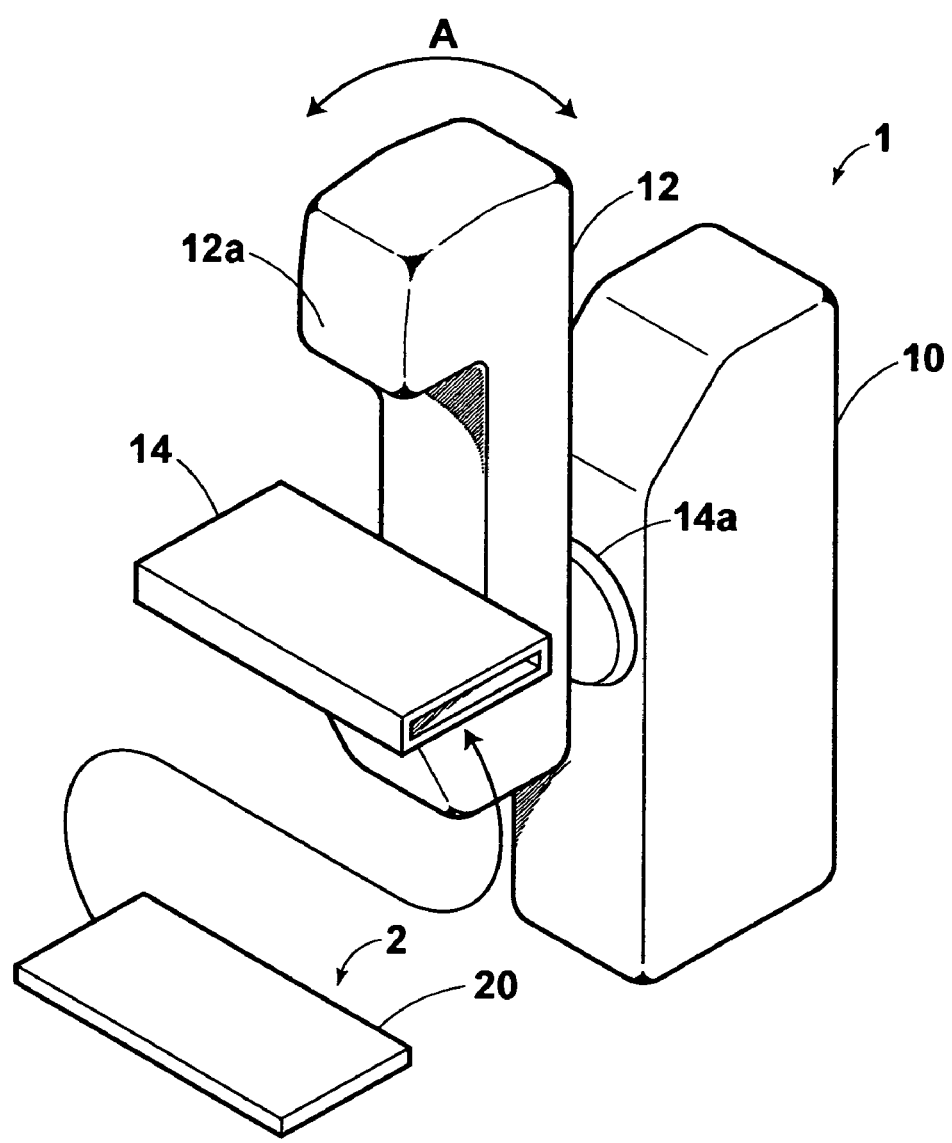
FIG. 1 schematically shows the structure of a mammographic X-ray system using a movable-component linear drive apparatus of the invention.

Hereinafter, an embodiment of a movable-component linear drive apparatus according to the present invention will be described with reference to the accompanying drawings. FIG. 1 schematically shows the structure of a mammographic X-ray system using a movable-component linear drive apparatus of the invention.

This mammographic X-ray system comprises, as shown in FIG. 1, a mammographic X-ray system main body 1 (hereinafter referred to simply as "X-ray system main body", for brevity), and a cassette 2 to be loaded to the X-ray system main body 1.

The X-ray system main body 1 comprises a radiophotography stand 10, an arm portion 12 mounted on the radiophotography stand 10, and a cassette holding portion 14 mounted on the arm portion 12.

More specifically, the arm portion 12 is mounted on the radiophotography stand 10 in an articulated manner via a joint portion 14a such that the arm portion 12 is pivotable about the joint portion 14a in the direction of arrow A. The arm portion 12 itself pivots as mentioned above, involving rotation of the cassette holding portion 14 in the direction of arrow A. A radiation emitting portion 12a, which is provided as an integral part of the arm portion 12, incorporates a radiation source. Radiation emitted from the radiation emitting portion 12a is directed onto the cassette holding portion 14, thereby irradiating a radiation image detector 30 within the cassette 2 loaded in the cassette holding portion 14 with the radiation. The X-ray photography of the present mammographic X-ray system is carried out with a subject of a radiophotograph being positioned between the radiation emitting portion 12a of the arm portion 12 and the cassette holding portion 14. The arm portion 12 is variously pivoted according to the purpose of radiography and radiophotographs are taken with the arm portion 12 being inclined at various angles.

Figure 2:
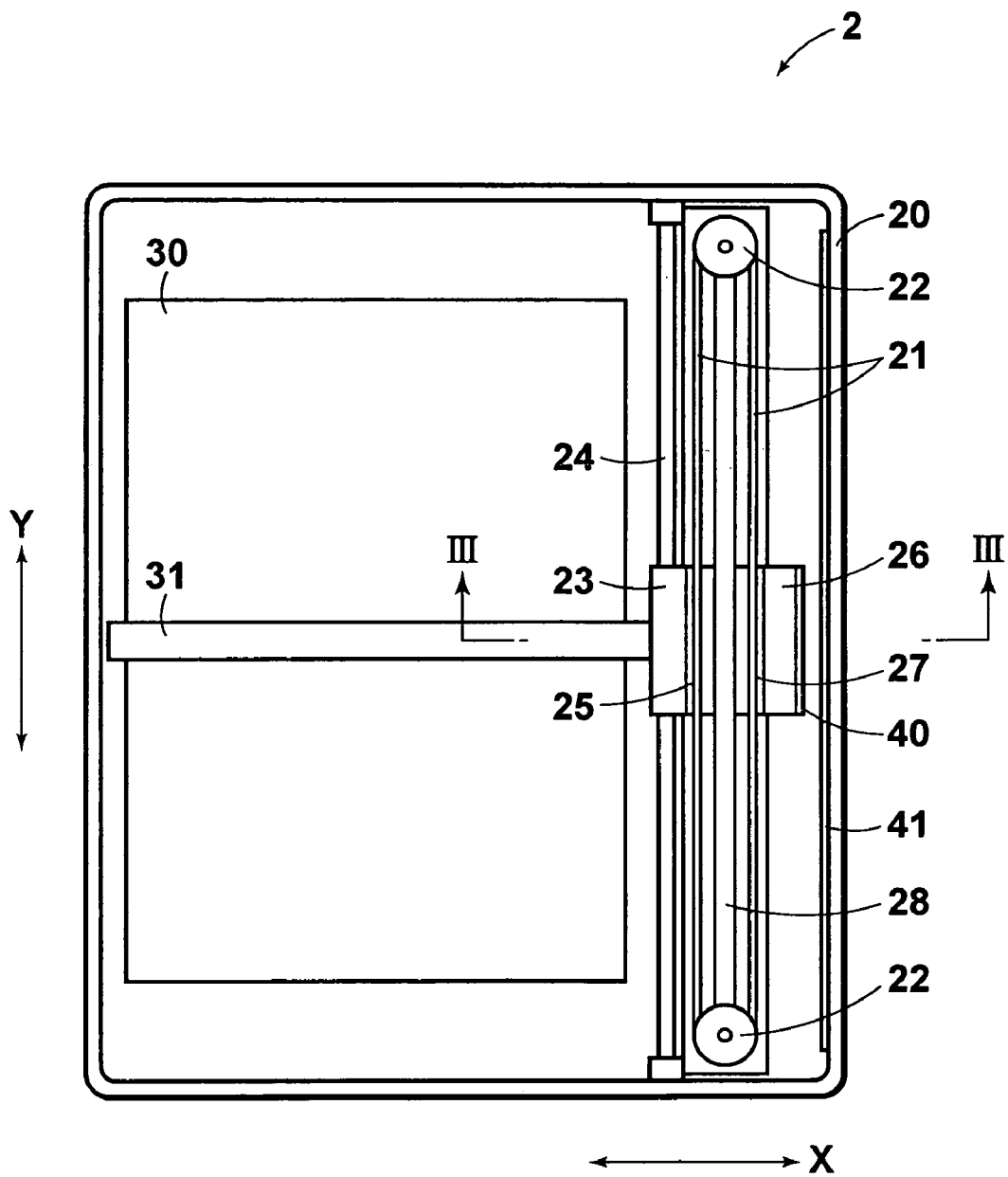
FIG. 2 schematically shows the structure of a cassette to be loaded in a cassette holding portion of the mammographic X-ray system shown in FIG. 1.
Figure 3:
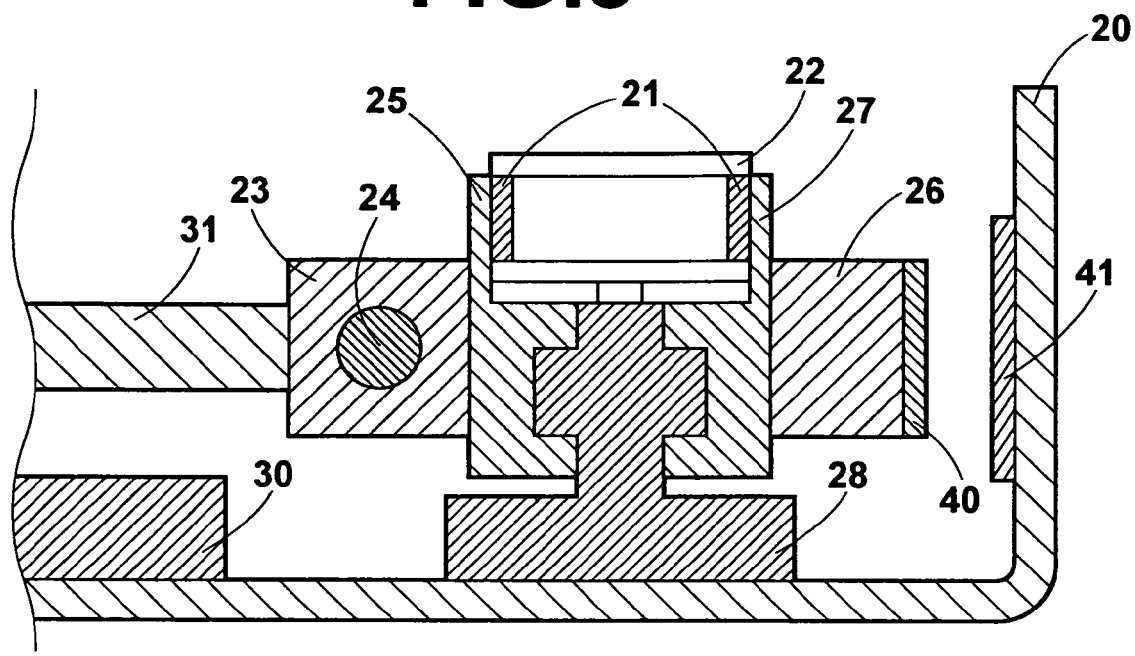
FIG. 3 is a cross-sectional view taken along line III-III of FIG. 2.

FIG. 2 schematically shows a structure of a cassette 2 to be loaded in the cassette holding portion 14 of the X-ray system main body 1 described above, and FIG. 3 shows a cross-sectional view taken along line III-III of FIG. 2.

The cassette 2 is parallelepiped-shaped. The cassette 2 comprises: a casing 20 formed of a material which transmits radioactive rays but blocks light rays; a radiation image detector 30 disposed within the casing 20; a reading light source portion 31 which emits linear reading light toward the radiation image detector 30; and a movable-component linear drive apparatus for linearly moving the reading light source portion. The cassette 2 is irradiated with radiation from below as viewed in FIG. 3.

The movable-component linear drive apparatus comprises: a belt 21 (endless member) formed in annular form; a pair of pulleys 22 (tensioning means) for tensioning the belt 21; a guide rail 28 arranged parallel to the direction (the direction Y in FIG. 2) of tensioning the belt 21; a first slide member 25 which is affixed to the belt 21 and slidable along the guide rail 28 in the longitudinal direction of the rail; a linear motor which is affixed to the slide member 25 and which serves as a movable component as well as an actuating device; a motor shaft 24 extending through the linear motor 23; a second slide member 27 which is affixed to the belt 21 at a position diagonally opposite to the first slide member 25 with respect to the center axis of the endless member and slidable along the guide rail 28 in the longitudinal direction of the rail; and a counterweight 26 affixed to the second slide member 27. The reading light source portion 31 is affixed to the linear motor 23. The linear motor 23 is reciprocated between its starting position (one end of the motor shaft 24) and its ending position (the other end of the motor shaft 24) by means of a controller (not shown), whereby the reading light source portion 31 is driven in the direction substantially parallel to the surface to be scanned with the reading light of the radiation image detector 30 (the direction Y in FIG. 2) and accordingly the scanning with the reading light is performed.

The linear motor 23 and the counterweight 26 are positioned on the belt 21 wound around both of the pair of the pulleys 22 such that they are diagonally opposite to each other with respect to the center axis of the endless member. Therefore, when the linear motor 23 moves, the counterweight 26 connected to the belt 21 is moved in the direction opposite to the moving direction of the linear motor 23, thereby preventing load fluctuations caused by a change in moving direction of the linear motor 23.

Further, a first magnet 40 is affixed on the counterweight 26 at a portion facing the inner surface of the casing 20, and a second magnet 41 of a polarity opposite of the polarity of the first magnet 40 is affixed on the inner surface of the casing 20 at a portion facing the first magnet 40. The first and second magnets 40 and 41 impart a bias load to the counterweight 26 in the direction (the X direction if FIG. 2) perpendicular to the tensioning direction of the belt, and thereby serve as damping devices for suppressing vibrations produced during movement of the movable components such as the reading light source portion 31 and the counterweight 26.

In this embodiment of the invention, a damping operation is effected by imparting a bias load to the counterweight 26 by the attraction force between the first and second magnets 40 and 41. However, such a bias load may be imparted by the magnetic repulsion between the magnets 40 and 41 by arranging the magnets 40 and 41 such that the facing surfaces of the magnets 40 and 41 have the same polarity. Alternatively, one of the magnets 40 and 41 may be made of a ferromagnetic substance so that a bias load is imparted by the attraction force between the magnet and ferromagnetic substance. Additionally or alternatively, the counterweight 26 may be provided with a roller which is urged against the inner surface of the casing 20 and rotated in the moving direction (the direction Y in FIG. 2) of the counterweight 26, thereby imparting the bias load.

Figure 4:
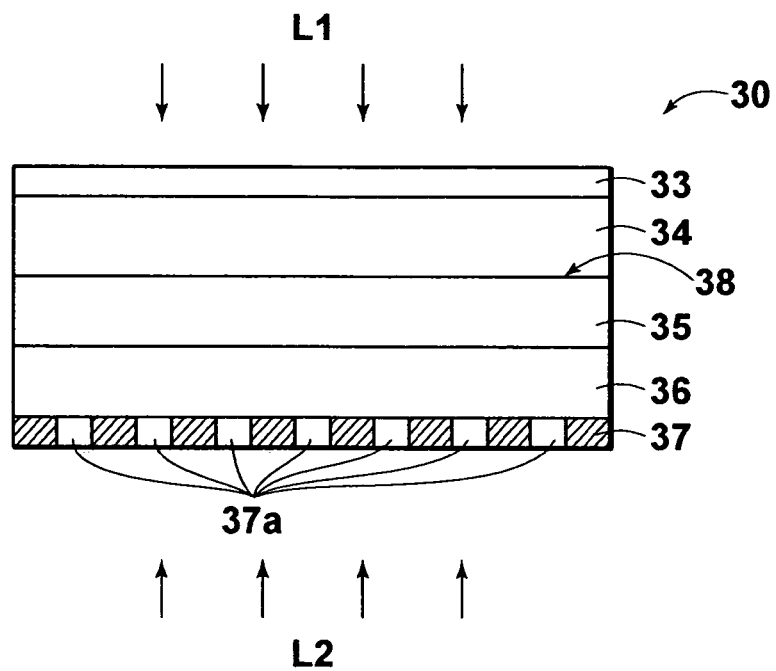
FIG. 4 is a diagram schematically showing the structure of a radiographic image detector provided within the cassette shown in FIG. 2.

As shown in FIG. 4, the radiation image detector 30 comprises a stack of layers in the following order: a first electrode layer 33 which transmits radiation L1 bearing thereon a radiation image; a recording photoconductive layer 34 which develops electric charges upon exposure to the radiation L1 transmitted through the first electrode layer 33; a charge transfer layer 35 which acts as an electrical insulator for the electric charges developed at the recording photoconductive layer 34 and acts as an electric conductor for transfer charges of a polarity opposite of that developed at the recording photoconductive layer; a reading photoconductive layer 36 which develops electric charges upon exposure to the reading light L2; and a second electrode layer 37 which transmits reading light L2 and comprises linearly extending linear electrodes 37a arranged substantially parallel to each other.

The aforementioned radiation image detector 30 is exposed to the radiation L1 from the first electrode layer 33 side and a quantity of latent image charges corresponding to a dose of the irradiated radiation L1 are accumulated at a charge accumulating portion 38 formed at the interface between the recording photoconductive layer 34 and the charge transfer layer 35, thereby recording the radiation image. Then, the reading light L2 from the second electrode layer 37 side transmits the linear electrodes 37a and irradiates the reading photoconductive layer 36. The charges of one polarity developed at the reading photoconductive layer 36 upon exposure to the reading light L2 is coupled with the latent image charges at the charge accumulating portion 38, and the electrode of the other polarity is detected by a current detection amplifier (not shown) connected to the linear electrodes 37a, whereby the radiation image is read out as an electric signal.

The radiation image detector 30 and the reading light source portion 31 are arranged such that the longitudinal direction of the reading light source portion 31 is substantially perpendicular to the longitudinal direction of the linear electrode 37a of the radiation image detector 30.

Next, operations of the present mammographic X-ray system will be described.

First, the cassette 2 configured as described above is loaded in the cassette holding portion 14 of the X-ray system main body 1. Then, the arm portion 12 is pivoted in the direction indicated by arrow A to a certain position according to the purpose of radiography. After that, radiation is emitted from the radiation emitting portion 12a with the subject being positioned between the radiation emitting portion 12a of the arm portion 12 and the cassette holding portion 14, transmitted through the subject, and impinged on the radiation image detector 30 within the cassette 2. Thus, a quantity of electric charges corresponding to a dose of the irradiated radiation is developed at the recording photoconductive layer 34 in the radiation image detector 30 and accumulated, as a result of which the radiation image the subject is recorded.

After the recording of the radiation image, the linear motor 23 disposed in the cassette 2 is driven by the controller (not shown), whereby the reading light source portion 31 is moved in the direction (the direction Y in FIG. 2) substantially parallel to the surface to be scanned with the reading light of the radiation image detector 30. Associated with this movement, the reading light source portion 31 is driven and its reading light is emitted toward the radiation image detector, whereby scanning with the reading light is performed.

In the scanning operation with the reading light, the radiation image recorded in the radiation image detector 30 is read out as an electric signal. After completion of scanning the radiation image detector 30, the reading light source portion 31 is returned to its starting position.

The radiation image recorded on the radiation image detector 30 is thus read out as an electric signal. At this time, this image readout operation may be performed without changing the position of the arm portion 12, that is, at a position where the radiation image is recorded. In such a case, the reading light source portion 31 has to be moved in a direction inclined with respect to the horizontal direction. According to the invention, the linear motor 23 which serves to move the reading light source portion 31 is affixed to the belt 21 tensioned by a pair of pulleys 22 and the counterweight 26 is affixed to the belt 21 at a position diagonally opposite to the portion, to which the movable component is affixed, with respect to the center axis of the endless member. This prevents load fluctuations caused by a change in moving direction of the linear motor 23, whereby stable movement of the linear motor 23 is ensured. Further, damping devices (magnets 40 and 41) which impart a bias load to the counterweight 26 in the direction perpendicular to the tensioning direction of the belt 21 is provided, so that vibrations produced during traveling of the linear motor 23 can be suppressed and accordingly the traveling accuracy of the linear motor 23 can be enhanced.

While the present invention has been described in terms of a specific embodiment where the scanning with the reading light is performed by moving the reading light source portion only, the present invention may also be applicable when the scanning with the reading light is performed by moving the radiation image detector with the reading light source portion being fixed or by moving both the reading light source portion and the radiation image detector.

Further, in the foregoing embodiment, a radiation image detector configured as described above is used as a medium for recording a radiation image. However, the present invention not limited thereto. For example, a stimulable phosphor sheet which records a radiation image upon exposure to the radiation and exhibits photostimulated luminescence upon exposure to the reading light may be used. When such a stimulable phosphor sheet is employed, a detecting device for detecting the photostimulated luminescence from the stimulable phosphor sheet is also disposed within the cassette.

What is claimed is:

1. A movable-component linear drive apparatus, comprising:
    an endless member in the form of rope or belt;
    a pair of tensioning means for tensioning the endless member;
    a movable component affixed to the endless member;
    a counterweight affixed to the endless member at a portion diagonally opposite to the portion, to which the movable component is affixed, with respect to the center axis of the endless member;
    damping means for imparting a bias load to the counterweight in the direction perpendicular to the tensioning direction of a part of the endless member adjacent to the counterweight;
    driving means for linearly driving the movable component in the same direction as the tensioning direction of a part of the endless member adjacent to the movable-component;
    a radiation image recording medium in which a radiation image is recorded upon exposure to radiation bearing the radiation image and from which the radiation image recorded therein is read out as a signal by scanning the radiation image recording medium with reading light; and
    a light source which is integrally attached to the movable component and emits linear reading light that extends in the direction perpendicular to the linearly moving direction of the movable component.

2. The movable-component linear drive apparatus as defined in claim 1, wherein the driving means is a linear motor which linearly drives the movable component in the tensioning direction of a part of the endless member adjacent to the movable-component.

* * * * *